US007386850B2

(12) United States Patent
Mullen (10) Patent No.: US 7,386,850 B2
(45) Date of Patent: Jun. 10, 2008

(54) ARRANGEMENT FOR SCHEDULING TASKS BASED ON PROBABILITY OF AVAILABILITY OF RESOURCES AT A FUTURE POINT IN TIME

(75) Inventor: David C. Mullen, Newcastle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 847 days.

(21) Appl. No.: 09/872,188

(22) Filed: Jun. 1, 2001

(65) Prior Publication Data
US 2003/0018762 A1 Jan. 23, 2003

(51) Int. Cl.
G06F 9/46 (2006.01)
H04M 3/00 (2006.01)

(52) U.S. Cl. .................. 718/104; 718/102; 379/265.01; 379/266.08; 379/309

(58) Field of Classification Search ........ 718/100–108; 707/1, 3–6; 379/67.1, 265.1, 265.02, 216.01, 379/266.08, 92.03, 112.01, 309, 265.01; 705/7, 8–11; 700/90, 100; 702/186
See application file for complete search history.

(56) References Cited

U.S. PATENT DOCUMENTS 4,797,839 A * 1/1989 Powell ........................ 700/90

(Continued)

FOREIGN PATENT DOCUMENTS

WO   WO 95/26535   * 10/1995

(Continued)

OTHER PUBLICATIONS

Vin et al. "A Statistical Admission Control Algorithm for Multimedia Servers", Proc. of ACM Multimedia, pp. 33-40 (1994).*

(Continued)

Primary Examiner—Meng-Al T. An
Assistant Examiner—Jennifer N. To
(74) Attorney, Agent, or Firm—David Volejnicek

(57) ABSTRACT

A resource task-completion forecaster (122) of an ACD (104) determines a probability that an agent (156) will complete servicing a presently-assigned call by a specified time horizon h. The forecaster determines (202) the type of call that the agent is servicing, determines (204) the amount of time t that the agent has already been servicing the call, retrieves (206) the mean and the variance of time historically spent by agents on servicing this type of call to completion, fits (208) the mean and the variance to a lifetime closed-form cumulative-probability distribution F, such as a Weibull distribution, to determine parameters of dispersion and central tendency, evaluates (210, 212) the distribution for t and h+t, computes (216) the probability of the agent not having completed servicing the call by now as Q=1−F(t), and computes (218) the probability that the agent will have completed servicing the call by the time horizon as $$P = \frac{F(t+h) - F(t)}{Q}.$$

A resource scheduler (124) sums (302) the probabilities P for all agents to obtain the number of agents that are expected to be available at the time horizon, and schedules (304) for the time horizon no more than that number of new calls for servicing by the agents.

53 Claims, 3 Drawing Sheets

U.S. PATENT DOCUMENTS

| | | | | |
|---|---|---|---|---|
| 4,829,563 | A | * | 5/1989 | Crockett et al. .............. 379/309 |
| 5,025,468 | A | * | 6/1991 | Sikand et al. ........... 379/266.08 |
| 5,214,688 | A | * | 5/1993 | Szlam et al. ............. 379/266.08 |
| 5,247,569 | A | * | 9/1993 | Cave ....................... 379/266.08 |
| 5,341,412 | A | * | 8/1994 | Ramot et al. ............. 379/92.03 |
| 5,570,419 | A | * | 10/1996 | Cave et al. ............. 379/266.08 |
| 5,615,121 | A | * | 3/1997 | Babayev et al. ................ 705/9 |
| 5,640,445 | A | * | 6/1997 | David .................... 379/112.01 |
| 5,712,985 | A | * | 1/1998 | Lee et al. ........................ 705/7 |
| 5,745,694 | A | * | 4/1998 | Egawa et al. ................ 718/104 |
| 5,802,161 | A | * | 9/1998 | Svoronos et al. ....... 379/216.01 |
| 5,889,799 | A | * | 3/1999 | Grossman et al. ..... 379/266.08 |
| 5,926,528 | A | * | 7/1999 | David .................... 379/112.01 |
| 5,953,229 | A | * | 9/1999 | Clark et al. .................. 700/100 |
| 5,963,911 | A | * | 10/1999 | Walker et al. .................. 705/7 |
| 6,006,269 | A | * | 12/1999 | Phaal ........................ 709/227 |
| 6,009,452 | A | * | 12/1999 | Horvitz ....................... 718/102 |
| 6,125,394 | A | * | 9/2000 | Rabinovich ................ 709/225 |
| RE37,073 | E | * | 2/2001 | Hammond ................. 379/67.1 |
| 6,393,433 | B1 | * | 5/2002 | Kalavade et al. ........... 707/200 |
| 6,466,664 | B1 | * | 10/2002 | Zhao ...................... 379/266.08 |
| 6,563,920 | B1 | * | 5/2003 | Flockhart et al. ........ 379/265.1 |
| 6,574,587 | B2 | * | 6/2003 | Waclawski ................... 702/186 |
| 6,799,042 | B1 | * | 9/2004 | Kauhanen et al. .......... 455/450 |
| 6,816,798 | B2 | * | 11/2004 | Pena-Nieves et al. ......... 702/84 |
| 6,850,613 | B2 | * | 2/2005 | McPartlan et al. ...... 379/265.02 |
| 6,970,829 | B1 | * | 11/2005 | Leamon ......................... 705/9 |
| 7,095,841 | B2 | * | 8/2006 | Mullen .................... 379/265.1 |
| 2003/0115244 | A1 | * | 6/2003 | Molloy et al. .............. 709/105 |

FOREIGN PATENT DOCUMENTS

WO      WO 98/22897     *    5/1998

OTHER PUBLICATIONS

Chapman et al., "Predictive Resource Scheduling in Computational Grids", Department of Computer Science, university College London, pp. 1-15.*

Lesaint, "Dynamic Workforce Scheduling for British Telecommunication plc", Interfaces 30, pp. 45-56, 2000.*

* cited by examiner

ARRANGEMENT FOR SCHEDULING TASKS BASED ON PROBABILITY OF AVAILABILITY OF RESOURCES AT A FUTURE POINT IN TIME

TECHNICAL FIELD

This invention relates to work management systems in general and to communications-serving and -distributing systems in particular.

BACKGROUND OF THE INVENTION

Work management systems, including call management, workflow automation, work distributor, and automatic call distribution (ACD) systems, distribute work items—whether tangible or intangible, and referred to herein as tasks—for servicing to resources, such as processing machines or call-center agents. In order to operate efficiently, work management systems must anticipate when resources will become available to serve a new task, so that they can have a task ready for a resource as soon as the resource becomes available and preferably no earlier. Otherwise, tasks such as calls must wait in queue for resources to become available, to the dissatisfaction of the callers, or resources sit idle while awaiting tasks to become available, to the detriment of operating efficiency of the system.

Work arrangement systems often do not use an accurate forecast of the future availability of presently unavailable resources. In these kinds of systems, resources are presently unavailable because they are performing tasks that are designated to be uninterruptible. That is, a resource can serve only one task at a time and cannot start a new task until the present task is completed. Additionally, only one resource can usually be assigned to a particular task. Illustrative such tasks involve live clients in transactions, such as telephone calls. Background tasks may be dynamically interspersed amongst them. Resources that are presently handling tasks are rendered presently unavailable. However, each unavailable resource can be expected to complete its task within a future time interval with a determinable probability. This expectation for the "arrival" of a resource can be based upon its time-in-state and the particular operational characteristics of the type of task, which the resource is serving.

Typically, automatic systems forecast the arrival of new tasks better than they forecast the arrival of resources to serve them. For example, one known call-management system does not use dynamic forecasts at all. Instead, its prediction algorithm triggers the initiation of new outgoing calls (tasks) for each agent (resource) after the agent has been in a 'work', 'record update', or 'wrap-up' state for a relatively fixed amount of time. The system does not compute a probability of task completion for agents, either collectively or individually. This results in low agent utilization, and in high client nuisance rates due to clients' time spent waiting in queue and client-abandoned calls.

A task-acquisition subsystem should strive to keep resources busy serving tasks at all times. For example, an outbound predictive dialer should initiate outbound calls based upon the aggregate availability of agents. The time horizon for this determination should be close to the amount of time that it takes to have an incremental outbound call attempt answered by a human being (i.e., to obtain a live-party answer). Then outbound calls can be initiated to generate a demand for service that appropriately reduces the gap between the supply of agents and the demand for them.

An automatic call distributor or work distributor dispatches a resource to serve lower-priority tasks when the supply of resources exceeds by some selected amount the demand for service by higher-priority tasks. In this case, the relevant time horizon for a forecast is typically close to the amount of time that the resources could be assigned to lower-priority tasks before becoming available again to service other tasks.

SUMMARY OF THE INVENTION

This invention is directed to solving these and other problems and meeting these and other requirements of the prior art. The invention provides an effective measure of an individual resource's contribution to the supply of available resources. It determines the contribution that a resource makes to resource availability. The aggregate resource supply may then be taken as the sum of the availabilities of the individual resources.

According to one aspect of the invention, a work-management method determines a probability of availability at a future point in time of a plurality of resources, combines (illustratively sums) the probabilities of the individual resources to obtain a number, and schedules for the future point in time no more than the number of new tasks for servicing by the plurality of resources. According to another aspect of the invention, a work-management method determines an amount of time t that a resource has been servicing a task by now, determines a probability F(t+h) of the resource servicing the task to completion within a total amount of time t+h, determines a probability F(t) of the resource completing servicing the task by now (within time t), determines a probability P that the resource will complete servicing the task within an amount of time h from now as $$\frac{F(t+h) - F(t)}{1 - F(t)},$$

and in response to P schedules another task for servicing. 1−F(t) is illustratively the equivalent of a determined probability of the resource not completing servicing the task by now (within time t). Preferably, the determining steps are performed for a plurality of resources, a number of the resources that will likely have completed servicing their respective tasks within the amount of time h from now is determined by summing the probabilities P that have been determined for the individual ones of the plurality of resources, and the number is used to schedule new tasks for servicing. Preferably, no more than the number of new tasks are scheduled for the amount of time h from now for servicing by the plurality of the resources.

This method is significant because it enables the realization of high service levels and high utilization of resources simultaneously. It can be used to improve customer service and reduce the burden on supervision in work-processing centers, including call centers and contact centers. A predictive dialer may use this method to avoid annoying call recipients with outbound calls for which no agent will be available to service them. A workflow system can use this method to ensure that it does not assign an available resource to low-priority work when the resource should be dedicated to higher-priority work.

While the invention has been characterized in terms of method, it also encompasses apparatus that performs the method. The apparatus preferably includes an effecter—any entity that effects the corresponding step, unlike a means—for each step. The invention further encompasses any computer-readable medium containing instructions which, when executed in a computer, cause the computer to perform the method steps.

These and other features and advantages of the invention will become more apparent from the following description of an illustrative embodiment of the invention considered together with the drawing.

DETAILED DESCRIPTION OF AN ILLUSTRATIVE EMBODIMENT

Reference will now be made in detail to the illustrative embodiment of the invention, which is illustrated in the accompanying drawing. While the invention will be described in conjunction with the illustrative embodiment, it will be understood that it is not intended to limit the invention to this embodiment. On the contrary, the invention is intended to cover alternatives, modifications, and equivalents, which may be included within the invention as defined by the appended claims.

Figure 1:
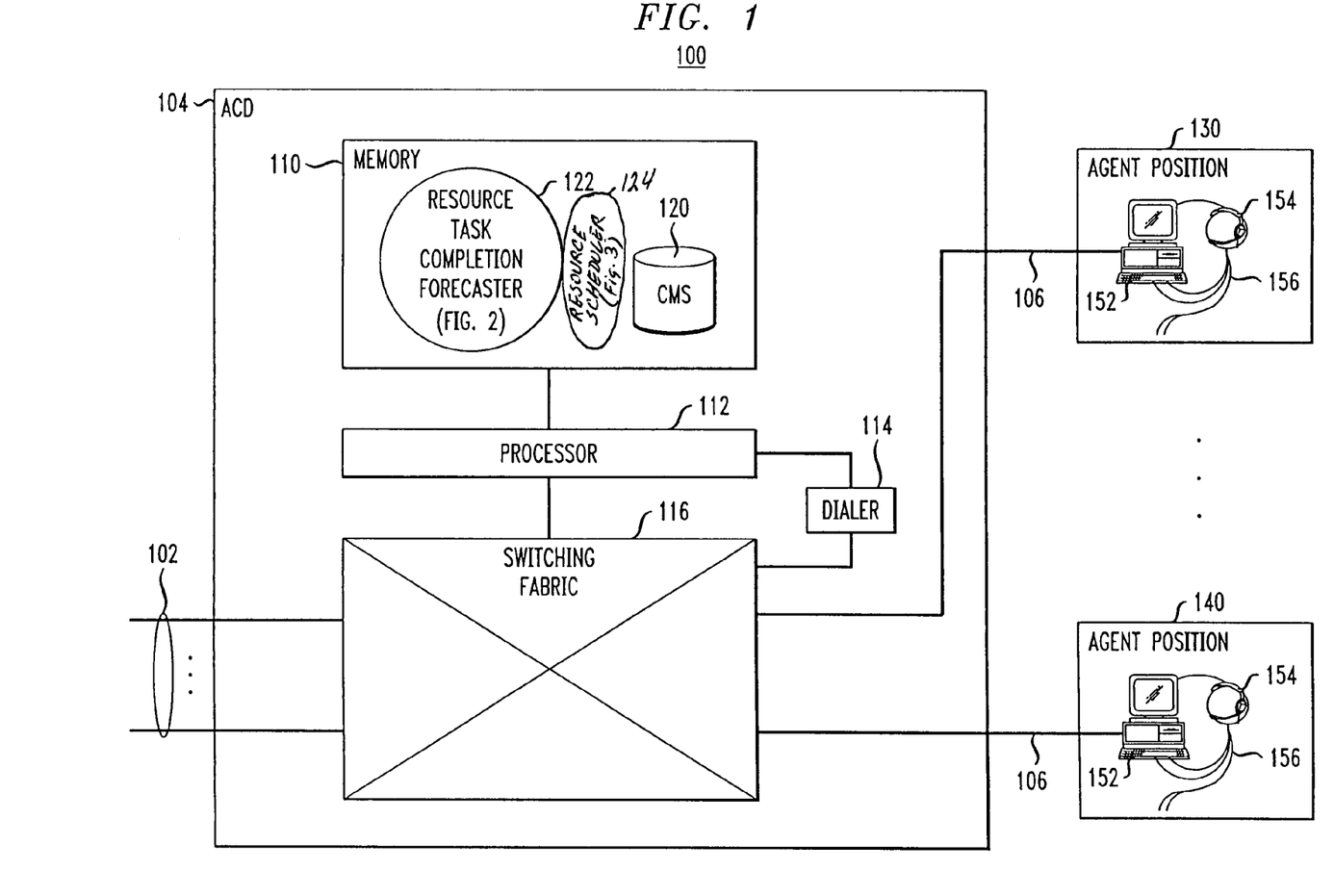
FIG. 1 is a block diagram of a call center that includes an illustrative embodiment of the invention.

FIG. 1 shows an illustrative call center 100 for servicing inbound and outbound calls. The word "call" is used herein generically to mean any communication or request for expeditious service. Call center 100 comprises an automatic call distributor (ACD) 104 that interconnects agent positions 130-140 via calls with the outside world to which it is connected by communications trunks 102. ACD 104 includes a switching fabric 116 that selectively interconnects trunks 102 with communications lines 106 that extend to agent positions 130-140. ACD 104 is a stored program-controlled apparatus that operates under control of a processor 112 that obtains and stores data in, and executes stored programs out of, memory 110 or any other computer-readable medium. Data in memory 110 include historical and operational data of ACD 104 and agents 156, which are stored in a call management system (CMS) 120 database. Processor 112 controls operation of switching fabric 116 and of a dialer 114 that generates outgoing calls on trunks 102 through switching fabric 116. Each agent position 130-140 includes a terminal 152, such as a personal computer, and a voice communications device, such as a telephone or a headset 154, for use by an agent 156. As described so far, call center 100 is conventional.

For purposes of the following discussion, a call, whether incoming or outgoing, constitutes a task to be served, and an agent position 130-140 that is presently staffed by an agent 156 constitutes a resource for serving tasks. According to the invention, memory 110 of ACD 110 includes a resource task-completion forecaster 122 program and a resource scheduler 124 program. Forecaster 122 forecasts a probability of completion of servicing a call by a certain time by an agent who is presently assigned to service the call. The forecast for each agent indicates a probability that the agent will complete servicing the presently assigned call, and consequently will become available to service another call, by a specified future point in time. Forecaster 122 thus provides a measure of contribution of individual agents 156 to the aggregate supply of available agents for use by resource scheduler 124 in automatically pacing the generation of outbound calls by dialer 114 and in automatically allocating agents 156 to calls. The configuration and operation of forecaster 122 is shown in FIG. 2 and is described in conjunction therewith.

Figure 2:
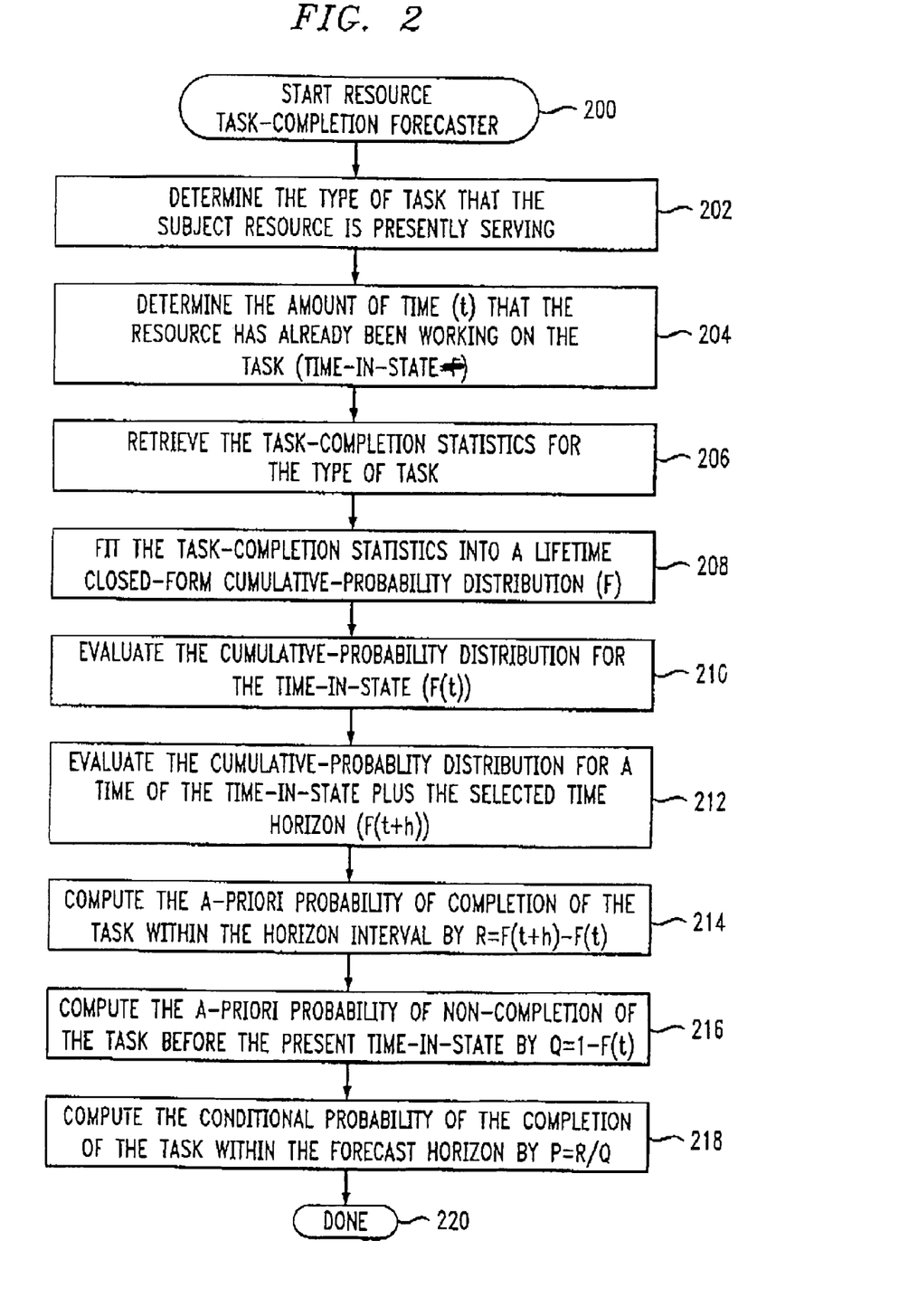
FIG. 2 is a functional diagram of a resource task-completion forecaster of the call center of FIG. 1.

Forecaster 122 performs the sequence of nine basic steps shown in FIG. 2. It is illustratively executed for each agent 156 at any time that ACD 104 could have a need for an agent 156 or a need for work at some future point in time (a horizon interval h). Forecaster 122 could execute periodically and whenever a call or an agent changes state. Upon its invocation, at step 200, forecaster 122 initially determines the type of call that the agent 156 whose task-completion forecast it is attempting to compute is presently serving, at step 202, and from the call's record determines the amount of time that the agent 156 has already spent servicing this call, at step 204. The time determined at step 204 is called "time-in-state" t.

Forecaster 122 then retrieves from the CMS 120 the task-completion characteristics for this type of call, at step 206, and fits the task-completion statistics into a lifetime closed-form cumulative-probability distribution F, at step 208. Forecaster 122 then numerically evaluates the cumulative-probability distribution F for the time-in-state t as F(t), at step 210, and also numerically evaluates the cumulative probability distribution for a time comprising the sum of the time-in-state t and the selected time horizon h as F(t+h), at step 212. These steps require prior execution of steps 204 and 208. Forecaster 122 then computes the a-priori probability of completion of servicing the call within the horizon interval as R=F(t+h)−F(t), at step 214, and also computes the a-priori probability of non-completion of servicing the call before the horizon interval expires as Q=1−F(t), at step 216. These steps require prior execution of steps 210 and 212. Finally, forecaster 122 computes the conditional probability of completion of servicing the call within the forecast horizon as $$P = \frac{R}{Q}$$

at step 218. Step 218 requires prior execution of steps 214 and 216. Forecaster 122 then ends its operation, at step 220.

Step 202 uses the attributes of the call to classify it. When an agent 156 is servicing a call, typically the call is already classified to a great extent by conventional means. Such classification is typically needed by ACD 104 for the purpose of routing the call and distributing it to agent positions 130-140. The call can be differentiated by the channel, the relationship, the customer type, the destination directory number, etc. Examples of the type of channel are inbound voice call, voice message, outbound telephone call, e-mail, FAX, letter, and World Wide Web hit. The relationship could be existing customer, prospective customer, or unknown. The existing-customer type could be preferred, normal, or marginal. The destination directory number can determine the motivation for the call or the expected type of transaction, such as inquiry, loan request, order, sales, post-sales customer service, etc. Additionally, the customer or prospect record and the skill attributes of the agent can provide a myriad of attributes that distinguish the calls. Generally, the more fully that a call is classified, the less variance is there in the work statistics for completion of the servicing of the call.

Step 204 generally involves retrieving a clock time that was stored in the call record when the call was distributed to the agent, and then subtracting that clock time from the present clock time. This time-in-state is important because the outlook for completion of work generally changes as the work progresses. In contrast, most commonly-used queuing models assume that the outlook for completion of a transaction is invariant with respect to the amount of time already spent working on it. This step does not depend upon any previous steps.

In this illustrative embodiment, the task completion statistics that are retrieved at step 206 comprise at least the mean of the work time (i.e., first moment of the work time) and the variance of the work time (i.e., second moment of the work time) that either this particular agent or all agents on average have historically spent on servicing this type of call. The first moment (mean) and the second moment (variance) are conventional statistical measures. The sample mean is typically defined as the sum of the values of the samples divided by the number of samples:

$$\mu = \frac{1}{n}\sum_{i=1}^{n} x_i$$

while the sample variance is typically defined as the sum of the squares of the differences between the values of the samples and the mean divided by the number of samples less one:

$$\sigma^2 = \frac{1}{n-1}\sum_{i=1}^{n}(x_i - \mu)^2$$

Recent samples can be weighted more heavily by employing moving averages or exponential smoothing in the definitions of the mean and variance. The mean and variance could be determined by time and motion studies, or other theoretical models of agent or client behavior. Alternatively, histograms could be used to describe the distribution without benefit of descriptive statistics. Typically, these statistics would have been generated from samples of historical results for the subject type of call.

Step 208 involves fitting the statistics that were retrieved at step 206 to a classical closed-form cumulative-probability distribution, or alternatively representing the statistics in a histogram, in order to determine values for a dispersion parameter ($\alpha$) and a parameter of central tendency ($\beta$). For ease of computation, the illustrative embodiment uses a classical two-parameter Weibull distribution, which is a generalization of the exponential distribution. It gives the distribution of lifetimes of objects. The Weibull distribution is defined as $$F(t) = 1 - e^{-(t/\beta)^\alpha}$$

which gives the probability of the event occurring before time t. The mean is defined as $\mu = \beta\Gamma(1+\alpha^{-1})$.

The variance is defined as $\sigma^2 = \beta^2[\Gamma(1+2\alpha^{-1}) - \Gamma^2(1+\alpha^{-1})]$.

The skewness is defined as $$v1 = \frac{2\Gamma^3(1+\alpha^{-1}) - 3\Gamma(1+\alpha^{-1})\Gamma(1+2\alpha^{-1}) + \Gamma(1+3\alpha^{-1})}{[\Gamma(1+2\alpha^{-1}) - \Gamma^2(1+\alpha^{-1})]^{3/2}}$$

and the kurtosis is defined as $$v2 = \frac{\Gamma(1+4\alpha^{-1}) - 4\Gamma(1+3\alpha^{-1})\Gamma(1+\alpha^{-1}) + 3\Gamma^2(1+2\alpha^{-1})}{[\Gamma(1+2\alpha^{-1}) - \Gamma^2(1+\alpha^{-1})]^2} - 6$$

where $t \in [0,\infty]$, e is the base of natural logarithms, $\alpha$ is the dispersion parameter, $\beta$ is the parameter of central tendency, and $\Gamma$ is the classical "gamma" function defined as $\Gamma(x) = \int_o^\infty y^{x-1} e^{-y} dy$, where x>O.

The following steps describe a method of numerically evaluating the classical gamma function. This method is simpler, quicker, but less accurate than other known methods.

1. Assign the input argument's value to x.
2. Enforce a positive argument by x←max(x,0.0001).
3. If x<1, then z←x+1 to assign a value to the input parameter of the core method for arguments greater than 1.
4. If x≧1, then z←x to assign a value to the input parameter of the core method for arguments greater than 1.
5. y←z+4.5.
6.

$$w \leftarrow \ln\left[1 + \frac{76.180091729406}{z} - \frac{86.505320327112}{z+1} + \frac{24.01409822223}{z+2} - \frac{1.23173951614}{z+3}\right]$$

where ln is the natural logarithm function, with a base of e.

7. $w \leftarrow w + (z-0.5)\log(y) - y + \ln(\sqrt{2\pi})$. This is the natural logarithm of the gamma function for an input argument not less than 1.
8. If x≠z, then w←w−ln(x) to get the natural logarithm of the gamma function in the case where the input argument is less than 1.
9. Compute the gamma function value from the natural logarithm of the gamma function value by $\Gamma \leftarrow e^w$.

Given the mean $\mu$ and the variance $\sigma^2$ about the mean, one method of fitting statistics to the two-parameter Weibull distribution determines an approximation for the parameters $\alpha > 0$ and $\beta > 0$ for the cumulative probability Weibull distribution as follows. The method determines the value of $\alpha$ by $$\alpha = \frac{1}{x_i}.$$

It determines x by iteration as follows. First, $x_0 = 1$; then, for each succeeding $+1^{th}$ iteration $$x_{i+1} = \frac{x_i[g(2x_i) - 2g(x_i)]}{g(2x_i) - g(x_i)}$$

where $$g(x) = \log(\Gamma(2x+1)) - 2\log(\Gamma(x+1)) - \log\left(\frac{\sigma^2}{\mu^2} + 1\right).$$

Normally three or four iterations are sufficient, i.e., $$\alpha = \frac{1}{x^3} \text{ or } \frac{1}{x^4}.$$

Then the method determines β from the mean and α by $$\beta = \frac{\mu^2}{\Gamma\left(\frac{1}{\alpha} + 1\right)}.$$

For example, assume that the mean μ is 110 seconds and the variance σ² about the mean is 18150 seconds squared. Then log [σ²/μ²+1]=log(2.5)=0.9162907. With x=1, Γ(x+1)=Γ(2)=1 and Γ(2x+1)=Γ(3)=2; and g(x)=log(2)−2log(1)−0.9162907=−0.22314. Γ(4x+1)=Γ(5)=24, so g(2x)=log(24)−2log(2)−0.9162907=0.8754687.

Consequently, the next value for x is $$x_1 = \frac{x_0(0.8754687 - 2*(-0.22314))}{0.8754687 - (-0.22314)} = \frac{(1)(0.8754687 + 0.44628)}{1.098609} = 1.2031.$$

Then $g(x_1)$=0.014585116 and $g(2x_1)$=1.3564625 giving the next x as $x_2$=1.215913. $g(x_2)$=0.001112875 and $g(2x_2)$=1.387193 giving the next x as $x_3$=1.216887.

Taking $x_3$ to be x, the method gives $$\alpha = \frac{1}{x} = \frac{1}{1.216887} = 0.82178047.$$

Finally, $$\beta = \frac{\mu}{\Gamma\left(\frac{1}{\alpha} + 1\right)} = \frac{110}{\Gamma(2.216887)} = \frac{110}{1.112066933} = 98.914909 \text{ seconds}.$$

So, the method determines the fit to the Weibull distribution to be $$F(t) = 1 - e^{-(t/98.914909)^{0.82178047}}.$$

A variety of means can be employed to perform the fit. Typically, this involves some iteration, and errors can be expected. One can reduce the magnitude of errors by using more parameters to describe the distribution. Step 208 requires the previous execution of step 206.

At step 210, the probability distribution F is evaluated for time value t. This step requires the previous execution of steps 208 and 204.

At step 212, the horizon interval h is selected based on when in the future the system expects to have a need for an agent 156. For example, if it is known that it typically takes x seconds from the time that dialer 114 dials a call to the time when the call is answered, and the system is trying to determine whether or not to cause dialer 114 to dial a call at this instant, the value of h may be selected to be x.

Step 214 gives the a-priori probability of completion of servicing the call during the horizon interval without consideration of the amount of time that has already been spent servicing the call without completing it. This is the outlook for completing the servicing of the call in the horizon interval assuming that servicing of the call has not yet started. In practice, this value must usually be attenuated or subject to a floor in order to avoid unrealistically low values that are not supported by sample data from historical experience.

Step 216 gives the a-priori probability that the agent has not completed servicing the call by the time-in-state. This value requires the same attenuation as is applied in step 214.

Step 218 computes the conditional probability of completion in the horizon interval, given the agent's tenure on servicing the call (the time-in-state). When an attenuation scheme is applied to steps 214 and 216, the result of step 218 should approach zero asymptotically as the time-in-state increases. Thus, a proper attenuation scheme effectively discounts the "arrival" of agents (i.e., agents becoming available) with "outlier" times-in-state. "Outlier" times are times that are grossly out-of-normal.

Figure 3:
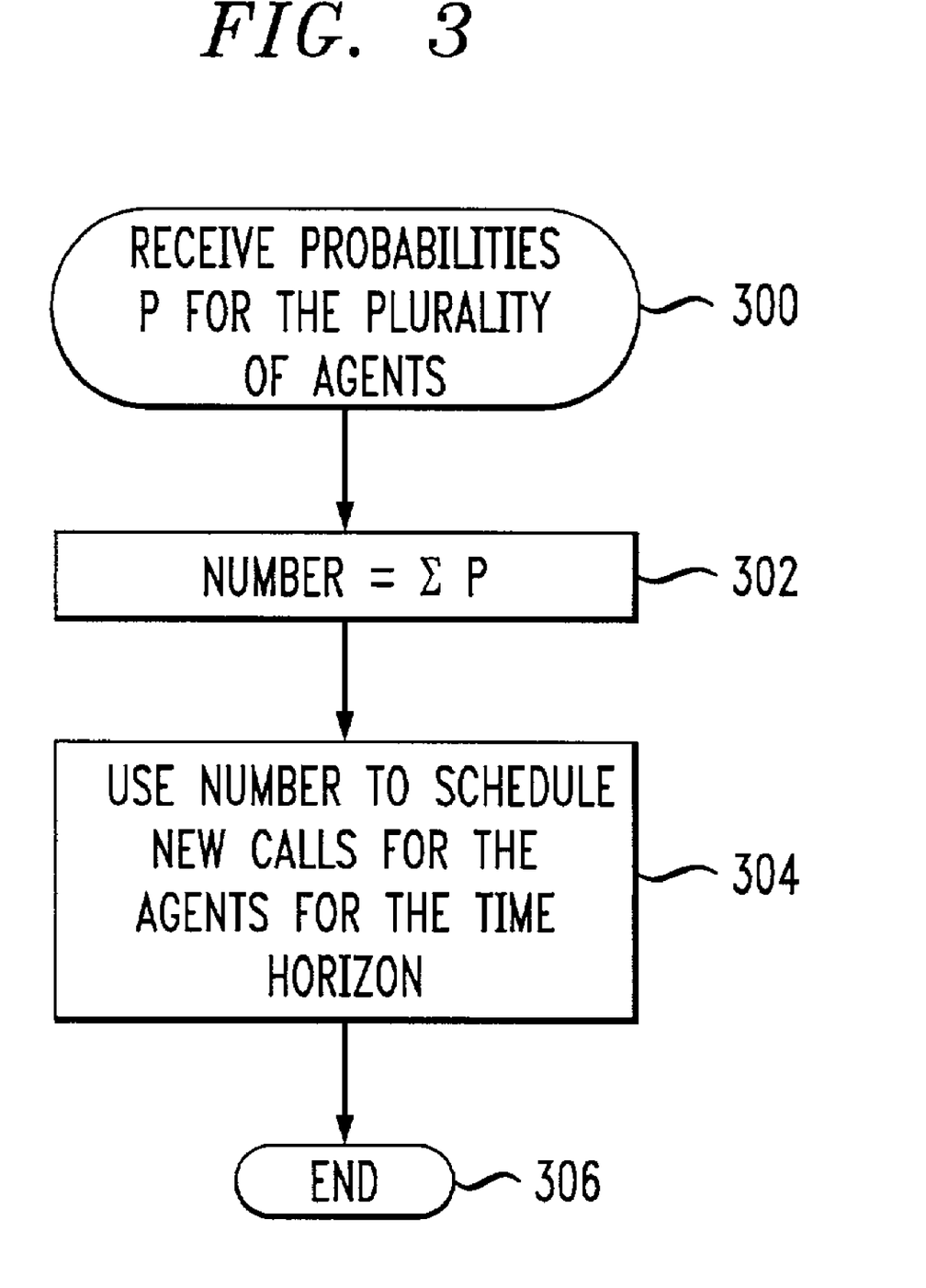
FIG. 3 is a functional diagram of a task scheduler of the call center of FIG. 1.

The basic functionality of resource scheduler 124 is shown in FIG. 3. Upon receiving the probabilities P for each agent 156 calculated by forecaster 122, at step 300, it combines those probabilities, preferably by summing them, at step 302, to obtain a number. The sum of the probabilities P determined for all agents 156 represents the expected number of available agents 156 within the forecast horizon h. Resource scheduler 124 then uses the number to schedule new tasks (calls) for agents 156, at step 304. Preferably, scheduler 124 schedules no more than that number of new calls to become available for servicing by the agents for the forecast horizon. Illustratively, scheduling that number of new calls involves directing dialer 114 to place as many outbound calls as are expected to result in that number of calls being answered by a person. Resource scheduler 124 then ends its operation, at step 306.

The invention is useful for the automation of resource allocation and various dispatching operations, especially in an environment of differentiated tasks and differentiated resources where control of expeditious service is required for some of the tasks. For example, a predictive dialer may use this method to avoid annoying call recipients with outbound calls for which no agent will be available to service them. Workflow systems can use this method to ensure that they do not assign available resources to low-priority work when the resources should be dedicated to higher-priority work. The invention can thus facilitate the integration of back-office work with front-office call work, including the integration of outbound call systems with workflow systems.

Of course, various changes and modifications to the illustrative embodiment described above will be apparent to those skilled in the art. For example, the tasks could have possible outcomes of failure or success in that the agent could become unavailable with some probability, the tasks could involve serial steps each of which has statistics facilitating an arrival forecast, the forecast could depend upon the statistics of the path of the automated script taken by the agent, the forecasting method could apply to the generation of work subject to lead time uncertainties, the scheduler could schedule work based on criteria for answer delay including service levels, the scheduler could schedule work based upon utilization of resources, a forecast could be performed for several time horizons h and the scheduler could employ necessary or sufficient criteria for each forecast, the scheduler could employ this method conditionally based on normal conditions while under abnormal conditions employing another method, the forecasting could employ handicaps for agents so as to get a better forecast for each individual agent, the statistics and forecasting could be differentiated by agent type and call type, individual agent statistics could be updated asynchronously and independently from the generation of the aggregate arrival statistics, the frequency of updating an individual arrival probability could depend on the state of the work on the call, the update of each call could be programmed for only certain times in state (e.g. 0, 5, 20, 40, 60, 80, 100, and 150), or the forecast horizon h could adjust dynamically to systematically provide a "worst-case" forecast. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A work-management method comprising:
for a future point in time, determining a probability of availability of each resource of a plurality of resources at said future point in time, to obtain the probabilities of availability of the plurality of the resources, comprising
determining an amount of time that a resource has already spent servicing a task,
determining a first probability of completion of the servicing of the task by the resource by the future point in time without consideration of the amount of time that the resource has already spent servicing the task,
determining a second probability that the resource has not completed servicing the task within the amount of time that the resource has already spent servicing the task, and
determining from the first and the second probability a third probability of completion of the servicing of the task by the resource by the future point in time considering the amount of time that the resource has already spent servicing the task;
combining together the third determined probability of availability of each resource of the plurality of resources to obtain a number that is a result of the combining; and
using the number to schedule new tasks for the resources for the future point in time.

2. The method of claim 1 wherein:
using the number to schedule new tasks comprises
scheduling for the future point in time no more than the number of the new tasks to become available for servicing by the plurality of the resources.

3. The method of claim 2 wherein:
combining together the determined probabilities comprises
summing the probabilities to obtain the number.

4. A work-management method comprising:
for a future point in time, determining a probability of availability of each resource of a plurality of resources at said future point in time, to obtain the probabilities of availability of the plurality of the resources, comprising
determining an amount of time t that each resource of the plurality of resources has been servicing a task by now,
for each of the resources, determining a probability F(t+h) of the resource servicing its task to completion within a total amount of time t+h, where h is a selected time horizon,
for each of the resources, determining a probability F(t) of the resource completing servicing its task by now, and
for each of the resources, determining a probability P that the resource will complete servicing its task at the future point in time the amount of time h from now as $$\frac{F(t+h) - F(t)}{1 - F(t)}.$$

combining together the determined probabilities of availability of the plurality of resources to obtain a number that is a result of the combining; and
using the number to schedule new tasks for the resources for the future point in time.

5. The method of claim 4 in a call center wherein:
the new tasks comprise calls; and
using the number to schedule new tasks comprises
in response to P, determining whether or not to initiate or cancel an outbound call.

6. A work-management method comprising:
determining an amount of time t that a resource has been servicing a task by now;
determining a probability F(t+h) of the resource servicing the task to completion within a total amount of time t+h, where h is a selected time horizon;
determining a probability F(t) of the resource completing servicing the task by now;
determining a probability P that the resource will complete servicing the task within the amount of time h from now as $$\frac{F(t+h) - F(t)}{1 - F(t)};$$

and
in response to P, scheduling another task for servicing.

7. The method of claim 6 wherein:
scheduling comprises
in response to P, determining whether or not to initiate said another task.

8. The method of claim 6 in a call center wherein:
the new tasks comprise calls; and
scheduling comprises
in response to P, determining whether or not to initiate an outbound call.

9. The method of claim 6 further comprising:
performing the determining steps for a plurality of resources, and determining a number of the resources that will likely have completed servicing their respective tasks within the amount of time h from now as a sum of the probabilities P determined for individual ones of the plurality of resources; wherein
scheduling comprises
in response to determining the number of the resources, scheduling new tasks for servicing.

10. The method of claim 9 wherein:
scheduling tasks for servicing comprises scheduling no more than the number of the tasks for servicing.

11. The method of claim 6 wherein:
determining a probability F(t+h) comprises
obtaining historical task-completion statistics, and
from the obtained statistics determining the probability F(t+h); and
determining a probability F(t) comprises
from the obtained statistics determining the probability F(t).

12. The method of claim 11 wherein:
obtaining historical task-completion statistics comprises
obtaining a mean and a variance of time historically spent by resources on servicing tasks to completion.

13. The method of claim 6 wherein:
determining a probability F(t+h) comprises
obtaining historical task-completion statistics,
fitting the task-completion statistics into a lifetime closed-form cumulative-probability distribution to determine parameters of the distribution, and
evaluating the distribution with the determined parameters and the total amount of time t+h to obtain F(t+h); and
determining a probability F(t) comprises
evaluating the distribution with the determined parameters and the amount of time t to obtain F(t).

14. The method of claim 13 wherein:
obtaining historical task-completion statistics comprises
obtaining a mean and a variance of time historically spent by resources on servicing tasks to completion;
the cumulative-probability distribution F comprises a Weibull distribution; and
the parameters comprise a dispersion parameter and a parameter of central tendency.

15. The method of claim 6 wherein:
determining an amount of time t comprises
determining the amount of time t that the resource has been servicing a task of one of a plurality of different types of tasks; and
determining historical task-completion statistics comprises
determining the historical task-completion statistics for the one type of tasks.

16. The method of claim 6 wherein:
scheduling another task comprises
in response to P initiating preparation of a task that may require servicing by an agent at a later time.

17. The method of claim 6 wherein:
determining a probability F(t+h) comprises
obtaining a historical histogram for task completion, and
evaluating a cumulative said probability with the obtained histogram for the total amount of time t+h to obtain F(t+h); and
determining a probability F(t) comprises
evaluating the cumulative probability with the obtained histogram for the amount of time t to obtain F(t).

18. The method of claim 6 wherein:
scheduling comprises
in response to P, canceling preparation of a task that could require servicing by a resource.

19. A computer-readable medium containing instructions which, when executed in a computer, cause the computer to perform the steps of:
for a future point in time, determining a probability of availability of each resource of a plurality of resources at said future point in time, to obtain the probabilities of availability of the plurality of the resources, comprising
determining an amount of time that a resource has already spent servicing a task,
determining a first probability of completion of the servicing of the task by the resource by the future point in time without consideration of the amount of time that the resource has already spent servicing the task,
determining a second probability that the resource has not completed servicing the task within the amount of time that the resource has already spent servicing the task, and
determining from the first and the second probability a third probability of completion of the servicing of the task by the resource by the future point in time considering the amount of time that the resource has already spent servicing the task;
combining together the third determined probability of availability of each resource of the plurality of resources to obtain a number that is a result of the combining; and
using the number to schedule new tasks for the resources for the future point in time.

20. The medium of claim 19 wherein:
using the number to schedule new tasks comprises
scheduling for the future point in time no more than the number of the new tasks to become available for servicing by the plurality of the resources.

21. The medium of claim 20 wherein:
combining together the determined probabilities comprises
summing the probabilities to obtain the number.

22. A work-management apparatus comprising:
a storage medium for storing instructions, and
a processor for executing the instructions, the medium and the processor together comprising:
means for determining, for a future point in time, a probability of availability of each resource of a plurality of resources at said future point in time, to obtain the probabilities of availability of the plurality of the resources, including
determining an amount of time that a resource has already spent servicing a task,
determining a first probability of completion of the servicing of the task by the resource by the future point in time without consideration of the amount of time that the resource has already spent servicing the task,
determining a second probability that the resource has not completed servicing the task within the amount of time that the resource has already spent servicing the task, and
determining from the first and the second probability a third probability of completion of the servicing of the task by the resource by the future point in time considering the amount of time that the resource has already spent servicing the task;

means cooperative with the determining means for combining together the third probability of availability of each resource of the plurality of resources to obtain a number that is a result of the combining; and means cooperative with the means for combining the determined probabilities, for scheduling no more than the obtained number of new tasks to be serviced by the plurality of the resources at the future point in time.

23. The apparatus of claim 22 wherein:

the means for combining together the determined probabilities comprise means for summing the probabilities to obtain the number.

24. The apparatus of claim 22 in a call center wherein:

the new tasks comprise calls; and the means for scheduling comprise means responsive to P, for determining whether or not to initiate or cancel an outbound call.

25. A work-management apparatus comprising:

a storage medium for storing instructions, and a processor for executing the instructions, the medium and the processor together comprising:

means for determining an amount of time t that a resource has been servicing a task by now;

means cooperative with the time-determining means for determining a probability F(t+h) of the resource servicing the task to completion within a total amount of time t+h, where h is a selected time horizon;

means cooperative with the time-determining means for determining a probability F(t) of the resource completing servicing the task by now;

means cooperative with both of the probability-determining means for determining a probability P that the resource will complete servicing the task within the amount of time h from now as $$\frac{F(t+h) - F(t)}{1 - F(t)};$$

and means cooperative with the P-determining means and responsive to P for scheduling another task for servicing.

26. The apparatus of claim 25 wherein:

the means for scheduling comprise means responsive to P, for determining whether or not to initiate said another task.

27. The apparatus of claim 25 in a call center wherein:

the new tasks comprise calls; and the means for scheduling comprise means responsive to P, for determining whether or not to initiate an outbound call.

28. The apparatus of claim 25 wherein:

the means for determining an amount of time t comprise means for determining the amount of time t for each of a plurality of resources;

the means for determining a probability F(t+h) comprise means for determining the probability F(t+h) for each of the plurality of resources;

the means for determining a probability F(t) comprise means for determining the probability F(t) for each of the plurality of resources, and means for determining a number of the plurality of resources that will likely have completed servicing their respective tasks within the amount of time h from now as a sum of the probabilities P determined for individual ones of the plurality of resources; and the means for scheduling comprise means responsive to determining the number of the resources, for scheduling new tasks for servicing.

29. The apparatus of claim 28 wherein:

the means for scheduling comprise means for scheduling no more than the number of the tasks for servicing.

30. The apparatus of claim 25 wherein:

the means for determining a probability F(t+h) comprise means for obtaining historical task-completion statistics, and means for determining the probability F(t+h) from the obtained statistics; and the means for determining a probability F(t) comprise means for determining the probability F(t) from the obtained statistics.

31. The apparatus of claim 30 wherein:

the means for obtaining historical task-completion statistics comprise means for obtaining a mean and a variance of time historically spent by resources on servicing tasks to completion.

32. The apparatus of claim 25 wherein:

the means for determining a probability F(t+h) comprise means for obtaining historical task-completion statistics, means for fitting the task-completion statistics into a lifetime closed-form cumulative-probability distribution to determine parameters of the distribution, and means for evaluating the distribution with the determined parameters and the total amount of time t+h to obtain F(t+h); and the means for determining a probability F(t) comprise means for evaluating the distribution with the determined parameters and the amount of time t to obtain F(t).

33. The apparatus of claim 32 wherein:

the means for obtaining historical task-completion statistics comprise means for obtaining a mean and a variance of time historically spent by resources on servicing tasks to completion;

the cumulative-probability distribution F comprises a Weibull distribution; and the parameters comprise a dispersion parameter and a parameter of central tendency.

34. The apparatus of claim 25 wherein:

the means for determining an amount of time t comprise means for determining the amount of time t that the resource has been servicing a task of one of a plurality of different types of tasks; and the means for determining historical task-completion statistics comprise means for determining the historical task-completion statistics for the one type of tasks.

35. The apparatus of claim 25 wherein:

the means for scheduling another task comprise means responsive to P for initiating preparation of a task that may require servicing by an agent at a later time.

36. The apparatus of claim 25 wherein:

the means for determining a probability F(t+h) comprise means for obtaining a historical histogram for task completion, and means for evaluating a cumulative said probability with the obtained histogram for the total amount of time t+h to obtain F(t+h); and the means for determining a probability F(t) comprise
means for evaluating the cumulative probability with the obtained histogram for the amount of time t to obtain F(t).

37. The apparatus of claim 25 wherein:
the means for scheduling comprise
means responsive to P, for canceling preparation of a task that could require servicing by a resource.

38. A work-management apparatus comprising:
a storage medium for storing instructions, and
a processor for executing the instructions, the medium and the processor together comprising:
means for determining, for a future point in time, a probability of availability of each resource of a plurality of resources at said future point in time, to obtain the probabilities of availability of the plurality of the resources;
means for determining, for each resource of the plurality of resources, an amount of time t that the resource has been servicing a task by now,
means for determining, for each resource of the plurality of resources, a probability F(t+h) of the resource servicing its task to completion within a total amount of time t+h, where h is a selected time horizon,
means for determining, for each resource of the plurality of resources, a probability F(t) of the resource completing servicing its task by now, and
means for determining, for each resource of the plurality of resources, a probability P that the resource will complete servicing its task at the future point in time the amount of time h from now as $$\frac{F(t+h) - F(t)}{1 - F(t)};$$

means cooperative with the determining means for combining together the probabilities of availability of the plurality of resources to obtain a number that is a result of the combining; and
means cooperative with the means for combining the determined probabilities, for scheduling no more than the obtained number of new tasks to be serviced by the plurality of the resources at the future point in time.

39. A computer-readable medium containing instructions which, when executed in a computer, cause the computer to perform the steps of:
for a future point in time, determining a probability of availability of each resource of a plurality of resources at said future point in time, to obtain the probabilities of availability of the plurality of the resources, comprising
for each resource of the plurality of resources, determining an amount of time t that the resource has been servicing a task by now,
for each resource of the plurality of resources, determining a probability F(t+h) of the resource servicing its task to completion within a total amount of time t+h, where h is a selected time horizon,
for each resource of the plurality of resources, determining a probability F(t) of the resource completing servicing its task by now, and
for each resource of the plurality of resources, determining a probability P that the resource will complete servicing its task at the future point in time the amount of time h from now as $$\frac{F(t+h) - F(t)}{1 - F(t)};$$

combining together the determined probabilities of availability of the plurality of resources to obtain a number that is a result of the combining; and
using the number to schedule new tasks for the resources for the future point in time.

40. The method of claim 39 for a call center wherein:
the new tasks comprise calls; and
using the number to schedule new tasks comprises
in response to P, determining whether or not to initiate or cancel an outbound call.

41. A computer-readable medium containing instructions which, when executed in a computer, cause the computer to perform the steps of:
determining an amount of time t that a resource has been servicing a task by now;
determining a probability F(t+h) of the resource servicing the task to completion within a total amount of time t+h, where h is a selected time horizon;
determining a probability F(t) of the resource completing servicing the task by now;
determining a probability P that the resource will complete servicing the task within the amount of time h from now as $$\frac{F(t+h) - F(t)}{1 - F(t)};$$

and
in response to P, scheduling another task for servicing.

42. The method of claim 41 wherein:
scheduling comprises
in response to P, determining whether or not to initiate said another task.

43. The medium of claim 41 for a call center wherein:
the new tasks comprise calls; and
scheduling comprises
in response to P, determining whether or not to initiate an outbound call.

44. The medium of claim 41 further comprising instructions which, when executed in the computer, cause the computer to perform the steps of:
performing the determining steps for a plurality of resources, and
determining a number of the resources that will likely have completed servicing their respective tasks within the amount of time h from now as a sum of the probabilities P determined for individual ones of the plurality of resources; wherein
scheduling comprises
in response to determining the number of the resources, scheduling new tasks for servicing.

45. The medium of claim 44 wherein:
scheduling tasks for servicing comprises scheduling no more than the number of the tasks for servicing.

46. The medium of claim 41 wherein:
determining a probability F(t+h) comprises
obtaining historical task-completion statistics, and
from the obtained statistics determining the probability F(t+h); and determining a probability F(t) comprises
from the obtained statistics determining the probability F(t).

47. The medium of claim 46 wherein:
obtaining historical task-completion statistics comprises
obtaining a mean and a variance of time historically spent by resources on servicing tasks to completion.

48. The medium of claim 41 wherein:
determining a probability F(t+h) comprises
obtaining historical task-completion statistics,
fitting the task-completion statistics into a lifetime closed-form cumulative-probability distribution to determine parameters of the distribution, and
evaluating the distribution with the determined parameters and the total amount of time t+h to obtain F(t+h); and
determining a probability F(t) comprises
evaluating the distribution with the determined parameters and the amount of time t to obtain F(t).

49. The medium of claim 48 wherein:
obtaining historical task-completion statistics comprises
obtaining a mean and a variance of time historically spent by resources on servicing tasks to completion;
the cumulative-probability distribution F comprises a Weibull distribution; and
the parameters comprise a dispersion parameter and a parameter of central tendency.

50. The method of claim 41 wherein:
determining an amount of time t comprises
determining the amount of time t that the resource has been servicing a task of one of a plurality of different types of tasks; and
determining historical task-completion statistics comprises
determining the historical task-completion statistics for the one type of tasks.

51. The medium of claim 41 wherein:
scheduling another task comprises
in response to P initiating preparation of a task that may require servicing by an agent at a later time.

52. The medium of claim 41 wherein:
determining a probability F(t+h) comprises
obtaining a historical histogram for task completion, and
evaluating a cumulative said probability with the obtained histogram for the total amount of time t+h to obtain F(t+h); and
determining a probability F(t) comprises
evaluating the cumulative probability with the obtained histogram for the amount of time t to obtain F(t).

53. The medium of claim 41 wherein:
scheduling comprises in response to P, canceling preparation of a task that could require servicing by a resource.

* * * * *